(12) United States Patent
Akashe et al.

(10) Patent No.: US 7,572,476 B2
(45) Date of Patent: Aug. 11, 2009

(54) PROCESS FOR PRODUCING A SIMULATED NUT

(75) Inventors: Ahmad Akashe, Mundelein, IL (US); Asma Ahad, Evanston, IL (US); Andrew McPherson, Mount Prospcet, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 602 days.

(21) Appl. No.: 10/322,940

(22) Filed: Dec. 18, 2002

(65) Prior Publication Data

US 2004/0121062 A1 Jun. 24, 2004

(51) Int. Cl.
*A23L 1/32* (2006.01)

(52) U.S. Cl. .................. 426/632; 426/634; 426/656

(58) Field of Classification Search ............... 426/656, 426/634, 632; 162/109, 117, 123, 125, 129–133, 162/100, 157.1, 141, 149, 146; 156/209, 156/219; 428/533–536, 537.5, 34.1–34.3, 428/156
See application file for complete search history.

(56) References Cited

U.S. PATENT DOCUMENTS

| | | | | |
|---|---|---|---|---|
| 1,774,110 A | * | 8/1930 | Sloat ........................ | 426/634 |
| 2,682,466 A | * | 6/1954 | Boyer ........................ | 426/104 |
| 2,952,544 A | | 9/1960 | Durst et al. | |
| 3,598,610 A | * | 8/1971 | Hawley et al. .............. | 426/634 |
| 3,615,656 A | * | 10/1971 | Alden ........................ | 426/533 |
| 3,719,497 A | | 3/1973 | Galle et al. | |
| 3,872,229 A | | 3/1975 | Durst et al. | |
| 3,872,230 A | | 3/1975 | Sinner et al. | |
| 4,084,013 A | | 4/1978 | Mikkelson et al. | |
| 4,217,369 A | | 8/1980 | Durst | |
| 4,789,664 A | * | 12/1988 | Seligson et al. .............. | 514/23 |
| 4,840,966 A | * | 6/1989 | Hara et al. .................. | 514/456 |
| 5,270,064 A | | 12/1993 | Shultz | |
| 6,146,638 A | * | 11/2000 | Kakimoto et al. ....... | 424/195.15 |
| 6,207,207 B1 | | 3/2001 | Belzowski et al. | |
| 6,303,177 B1 | | 10/2001 | Ning et al. | |
| 6,352,738 B1 | * | 3/2002 | Carels ........................ | 426/632 |
| 6,387,436 B1 | * | 5/2002 | Mazzoleni et al. .......... | 426/618 |
| 6,605,309 B2 | * | 8/2003 | Freeman et al. ............. | 426/607 |
| 6,676,982 B2 | * | 1/2004 | Mody ........................ | 426/93 |
| 2003/0026890 A1 | * | 2/2003 | Freeman et al. ............. | 426/658 |
| 2003/0138936 A1 | * | 7/2003 | Mizuguchi et al. ..... | 435/252.31 |

FOREIGN PATENT DOCUMENTS

| | | | |
|---|---|---|---|
| DE | 2342851 | * | 3/1975 |
| FR | 2245301 | | 4/1975 |

* cited by examiner

*Primary Examiner*—Anthony Weier
(74) *Attorney, Agent, or Firm*—Fitch, Even, Tabin & Flannery

(57) ABSTRACT

This invention relates to simulated nut production. More specifically, it relates to a method for producing a simulated nut, said method including providing a premix by mixing soy bean particles having surfaces, a nut flavoring, and a binder including a saccharide in a wet flowable form wherein the surfaces of the soy bean particles are coated with the binder, and forming the premix into a self-supporting shape that is substantially similar to a natural nut shape. The resulting simulated nut product is healthier due to the substantial soy content used instead of real nutmeat, while replicating authentic nut flavor, crunch, appearance, texture, and the like. The simulated nuts of the present invention can be made at less cost than obtaining real nuts.

14 Claims, No Drawings

PROCESS FOR PRODUCING A SIMULATED NUT

FIELD OF THE INVENTION

This invention relates to simulated nut production. More specifically, it relates to a method for producing a simulated nut, said method comprising providing a premix by mixing soy bean particles having surfaces, a nut flavoring, and a binder comprising a saccharide in a wet flowable form wherein the surfaces of the soy bean particles are coated with the binder, and forming the premix into a self-supporting shape that is substantially similar to a natural nut shape. The resulting simulated nut product is healthier due to the substantial soy content used instead of real nutmeat, while replicating authentic nut flavor, crunch, appearance, texture, and the like. The simulated nuts of the present invention can be made at less cost than obtaining real nuts.

BACKGROUND OF THE INVENTION

Production and trade in nuts for dietary use is a huge global industry. Nuts are used worldwide in large amounts by confectioners, cereal manufacturers, ice cream manufacturers, snack food manufacturers, bakers, chefs, cooks, and so forth. Consumption of snack foods is particularly high in the United States, with snack nuts alone accounting for approximately 7 percent of the total snack retail dollar sales, as reported in 1996. Johnson, D., *Fruit Trees and Tree Nuts Situation and Outlook*, Economic Res. Srv., USDA, Aug. 1997, pp. 35-41. Sales of snack nuts and seeds by the U.S. snack food industry in 1998 exceeded four billion dollars and represented approximately 20 percent of the total dollar value of all U.S. exports of snack foods for that year. *U.S. Industry and Trade Outlook*® 2000, National Technical Information Service & U.S. Dept. of Commerce, "Processed Foods and Beverages", The McGraw-Hill Companies, Ind., 35-1 to 35-17, 2000.

An important trend in the U.S. snack industry is to promote reduced-fat content snack foods., However, consumers generally tend to be resistant to reduced-fat or non-fat content snack foods since such product noticeably sacrifice the normal taste and other sensory attributes to which consumers have grown accustomed for that type of snack food product. Consequently, natural unprocessed foods, such as natural nuts, still have been widely used in various snack foods.

Natural nuts are an excellent source of dietary protein and fiber. Unfortunately, many popular natural nuts also are relatively high in fat content. Moreover, the price of many natural nuts has been subject to escalation, due in part to lower availability of certain popular types of nuts when a primary grower nation of that type of nut or nuts experiences a poor growing season due to bad weather, blight, and so forth. In addition, the processing of certain commercially valuable nuts like cashews requires expensive skin peeling machinery or labor intensive work. Therefore, a substitute snack product for natural nuts would have a significant market value if it was healthier and less costly to obtain while still maintaining the taste and other savory attributes normally associated with natural nuts.

Prior attempts have been made to prepare simulated nutmeats. U.S. Pat. No. 3,719,497 describes a process for making a simulated nutmeat prepared by forming a homogenous dispersion composed of minute droplets of fat or oil suspended in a continuous phase comprising an edible hydrophilic film-former and water (e.g., such as an aqueous protein suspension). The film former is described as nonfat milk solids, sodium caseinate, soy protein, egg albumen, egg yolk, wheat germ, gelatin, pea flour, bean flour, corn germ, dried whey, gelatinized starch, fish protein, bran protein, gum arabic, and other hydrophilic colloids such as carboxy-methyl cellulose. Powdered sugar can be included in the oil, fat, or film-former. The dispersion is atomized and dried to form particles composed of an oleaginous internal phase encapsulated within the protein film, which is pressed to form a self-supporting structure having a shape of natural nutmeat or ribbed patterns. The fat or oil is exemplified as hydrogenated vegetable shortening or oil used in major amounts, and the film-former is exemplified as isolated soy protein used in minor amounts of 10 percent or less, to which water is added to form an aqueous dispersion for film formation.

U.S. Pat. No. 3,872,229 also describes a food composition having a nut-like texture made by forming a homogenous dispersion composed of minute droplets of fat or oil, such as 10-80 percent oleaginous substance consisting of any type of vegetable or animal oil or fat mixture thereof, suspended in a continuous phase composed of a hydrophilic film-former and water, but in which the suspension is mixed under gas excluding conditions or in a filled, closed vessel and forming a dispersion that is extruded into a ribbon and optionally cut to resemble cut-up nutmeats. Powdered sugar can be included in the oil, fat, or film-former.

U.S. Pat. No. 2,952,544 describes nut-like food products made as crisp cellular structures with isolated oil or fat particles filling the voids or cells therein, in which vegetable oil of fat is combined with a film-forming substance, such as albumen, gelatin, agar, soy protein, wheat germ, wheat protein, and milk solids, and water, and the resulting dispersion is sheeted-out.

U.S. Pat. No. 3,872,230 describes a method for producing food compositions having a nut-like texture prepared by forming a homogenous dispersion comprising a continuous phase composed of a hydrophilic film-former and water, such as an aqueous protein suspension, in which the dispersion is mixed under vacuum and then shaped and dried.

U.S. Pat. No. 4,084,013 describes a continuous process for forming simulated nut-like food products comprising a mixture of fat, film former, and water by providing a mixing vessel or a plurality of vessels which include mixing zone portions distributed along the flow path of the material being prepared with one or more fluid inlets between the portions of the mixer.

U.S. Pat. No. 5,270,064 describes an encapsulated food product encompassing simulated seeds and simulated nuts for the animal food industry and snacks for humans formed as an edible core surrounded by an interface layer and a readily removable non-food capsule. The edible core is described as gluten, starches, sugars, honey, alginate agar, casein, carrageenan, dextran, vitamins, minerals, nutrient polymers, polyethylene glycol, albumin and other proteins, glycerol, vegetable oils, fat, mineral oil, antioxidants, electrolytes, bacterial inhibitors, and mold inhibitors. The interface comprises an edible oil and a dry fine particulate, while the non-edible shell is a polymerizable substance coated upon the core.

U.S. Pat. No. 6,207,207 describes a coated confectionary having a crispy starch based center with a thin continuous rigid outer coating. The starch based center is comprised of flour, grain, kernel or starch selected from the group consisting of rice, corn, wheat, potato, sweet potato, sago, waxy maize, sorghum, millet, tapioca, soy bean and mixtures thereof, which is preferably puffed or expanded.

The health benefits of soy beans have been widely reported. Soy beans are an excellent agricultural source of dietary protein and fiber. Soy beans have lower saturated fat content than real nutmeats used in common snack foods. Soy beans are one of the few plant sources of omega-3 fatty acids. Consumption of soy bean products also has been reported to help prevent coronary heart disease by reducing cholesterol levels, particularly "bad" LDL cholesterol levels. Soy bean product consumption may also play a role in preventing osteoporosis and in reduction of menopausal symptoms due to soy's rich content of phytoestrogens such as isoflavones. In addition, soy bean product consumption has been indicated to inhibit certain types of cancer and improve glucose tolerance. As such, the soy bean can be considered as a functional and a nutritional food source.

However, in the past, the considerable health potential and cost advantages of soy beans has not been significantly incorporated into simulated nut food products in particular. Although some of the above-mentioned prior processes may provide a formable film of artificial nutmeats, a need has remained for improvements whereby natural whole nuts might be simulated in taste, texture, shape, appearance, and so forth, using healthier ingredients yet without sacrificing taste properties.

The present process, which is both technically straightforward and attractive from a production cost standpoint, provides such improvements. Indeed, the present process makes it possible to prepare simulated whole nuts at reduced cost that are high quality replicates of their natural counterparts while also offering the health benefits of soy beans.

SUMMARY OF THE INVENTION

The present invention provides an improved process for producing simulated nuts, said process comprising (a) providing a premix by mixing soy bean particles, nut flavoring, and binder comprising a saccharide in a wet flowable form, in a manner effective to coat the surfaces of the soy bean particles with the binder, and (b) forming the premix into a self-supporting shape. Preferably, the self-supporting shape imparted to the premix is substantially similar to a natural whole nut shape to contribute to the perception that the simulated nut replicates a natural nut.

The resulting simulated nut product of this process provides a savory and/or sweet alternate snack experience to real nuts. The simulated nuts of this invention provide significant health advantages over real nuts due to their significant soy content used in place of real nutmeat while successfully replicating an authentic nut flavor, crunch, appearance, and texture. More particularly, the simulated nuts of this invention have high protein and fiber content and reduced fat content as compared to natural nuts, and provide other health benefits associated with regular consumption of soy beans. Moreover, the simulated nut products of this invention can be manufactured at less cost than obtaining their natural nut counterparts.

DETAILED DESCRIPTION OF THE INVENTION

The present invention relates to a process for producing a simulated nut comprising a self-supporting body containing solid soy bean particles and solid nut flavoring particles or natural nut flavors dispersed within an encapsulating material obtained from coating surfaces of the soy bean particles with a binder comprising a saccharide while the binder is in a wet flowable form to provide a premix that, in turn, is subjected to molding effective to form a nut shape. The effective replacement of substantial natural content in the simulated nut with soy provides a healthier product at lower cost than natural whole nuts.

For purposes of this invention, the term "soy bean" refers to the seeds of the soybean plant *Glycine max* (L.) Merrill, which belongs to the legume family. The soy bean used in the premix in this invention is preferably in the form of soy grits, soy bits, soy splits, and/or soy flours. In a more preferred aspect, the form of soy bean used is soy grits and/or soy flours. Soy flour is finely powdered particulate form of soy beans, while soy grits are a coarser solid granular material form of soy beans. Soy flour and grits are generally made by grinding and screening soybeans or soybean flakes. The soy flours and grits can be used in the premix ingredient full-fatted, defatted, partially defatted, or refatted forms.

For purposes of practicing this invention, the soy grits generally have a mesh screen size between No. 10 and No. 80 U.S. Standard Screen size, meaning the grits generally have a particle size between about 177 to about 2,000 microns. While the soy flour is finely ground such that it will pass through a No. 100 U.S. Standard Screen size, meaning the soy flour generally has a particle size less than about 149 microns. The soy grits or flour generally will constitute a major amount (i.e., at least 50 percent) of the premix composition.

Soy flours and grits generally are made by dehulling, grinding, and screening whole soy beans. Soy flour can be obtained by additional grinding or milling performed on soy grits. The soy flours and grits preferably should contain no more than about 4 percent crude fiber. The grinding or milling can be performed before or after any oil removal (defatting) is performed on the soy beans or soy bean flakes. The soy beans can be flaked after dehulling, and the full fat flakes can be used as the feed material for subsequent grinding or extraction procedures.

In one preferred embodiment, the soy flour and soy grits are full-fatted or essentially full-fatted soy particulate materials when used as an ingredient for the premix. "Essentially full fatted", for purposes herein, means the soy beans retain about 98 percent or more of the original fat content. Soy beans generally, but not necessarily always, contain an original fat content of about 18 to about 20 percent.

For defatted or partial defatted soy bean products, the defatting procedure generally includes steps of dehulling and flaking the soy beans followed by solvent extraction (e.g., hexane extraction) or mechanical extraction (e.g., extruding-expelling extraction) methods commonly used or useful for that purpose. Defatted soy flours and grits generally will contain about 1 percent or less of the original fat content. Refatted soy flours or grits optionally can be formed by combining lecithin or vegetable oil, such as soy oil, with defatted soy flours or grits in known manners. The addition rate of oil or lecithin is made to the desired level, usually about 5 to about 20 percent.

The soy grits or flour optionally can be toasted prior to use as a premix ingredient to increase the protein efficiency, functional properties, and/or physical texture. The soy beans used in making the flour or grits can be dehydrated before grinding or milling, such as by freeze-drying in which the soy beans are frozen and then dehydrated by application of a vacuum pressure condition according to generally known techniques. In one embodiment, the soy bean particulate ingredients of the premix are obtained by the steps of blanching raw whole soy beans, rinsing, freeze-drying, dehulling, optionally partially or fully defatting (deoiling), and comminuting and screening the soy beans to a desired solid particle size consistent with the intended use of the soy product as a flour or grit ingredient for the premix.

The protein content of soy flours and grits generally, but not necessarily in all cases, is in the range of about 40 to about 54 percent. The fat content of the soy ingredient may vary although it generally will be less than that of a corresponding amount of natural nut being simulated. Soy protein concentrates or soy protein isolates also may be used as the soy bean component. The soy bean protein concentrates typically contain at least about 65 percent protein, and soy protein isolates typically contain greater than about 90 percent protein. Since soy protein concentrates and isolates generally will impart a stronger soy taste to the simulated nuts, larger addition amounts of the real nut flavoring ingredient may be needed to counteract the stronger soy taste. For purposes of this invention, the general term "soy" can refer to any of soy grits, flour, protein concentrates, or isolates, or any combinations thereof.

The natural flavoring ingredient used in the premix is a particulate form of the type of the natural nut that is being simulated in the product of this invention. The natural nut flavoring ingredient preferably is a ground or milled flour form of the natural nutmeats having the desired nut flavor to be imparted to the simulated nut shaped product of this invention. The natural nut flours are readily dispersed with mixing in the wet flowable binder ingredient of the premix. The present invention can be used to prepare a wide variety of simulated nuts, including simulated peanuts and simulated tree nuts. Such simulated tree nuts include, for example, simulated almonds, walnuts, pistachios, pecans, hazelnuts, macadamia nuts, Brazil nuts, chestnuts, pine nuts, pignolia nuts, and so forth. Also, for purposes of this application, "peanuts" are classified as "nuts" even though peanuts botanically are members of the legume family.

The amount of natural flavoring added to the premix generally is a minor amount (i.e., less than 50 percent) of the total premix content. In general, the amount of natural nut flavoring ingredient added will be at least a minimum amount necessary to impart the natural flavoring to the taste of the simulated nut product. Typically, only minor amounts of nut flavoring are needed to accomplish this result. Consequently, costs saving are realized as substantial amounts of more expensive natural nut meat is replaced by less costly ingredients such as the soy particles and binder.

In a preferred aspect, the binder is a saccharide (i.e., monosaccharide, disaccharide, and polysaccharide) such as, for example, sucrose, dextrose (glucose), fructose, maltose, lactose, cellobiose, kojibiose, galactose, high fructose corn syrup, corn syrup, high maltose corn syrup, maltodextrin, starches, hydrocolloids, or combinations thereof. The saccharide binder can be introduced to the premix as a natural substance or substance obtained from processing of a natural substance, such as, for example, honey, corn syrup, molasses, brown cane sugar, sugar beet sugar, maple syrup, or combinations thereof.

The binder is used in wet flowable form at processing conditions, or heated if necessary to attain a wet flowable form at those conditions, so that it can directly contact and coat the outer surfaces of the discrete solid soy bean particles. The addition rate of the binder should be selected effective to provide enough binder to coat all or substantially all exposed surfaces of the soy bean particles, and flavoring particles, to envelope those particles before the resulting premix is consolidated into a self-supporting nut shape using molding or other suitable shaping techniques. In this manner, the binder forms a continuous phase into which the soy bean and flavoring particles are dispersed and encapsulated.

The term "wet", as used herein in connection with the binder, refers to the cohesive fluid-like character of the particles comprising the binder, as contrasted to a mass of discrete dry particles. The term "flowable", as used herein in connection with the binder, means the binder will assume the shape of the enclosed space into which it is introduced at processing conditions under action of gravity and/or external force applied to it. Thus, the binder will effectively coat and adhere to the soy particles. Preferably the binder is used in a molten condition. The use or provision of a binder in a wet flowable state ensures that the soy particles are encapsulated by the binder so that a robust self-supporting body can be formed that is essentially free of air pockets. Also, while several drops of water can be used to facilitate melting of any powdered form of saccharide source used, such as sucrose, most, if not all, of that minuscule amount of water ultimately will be evaporated from the heated molten sugar. Therefore, the blending of the soy particles, nut flavoring particles, and binder in the preparation of the premix in the process of the invention is performed "neat", or in an essentially water-free medium (i.e., less than about 1 percent water content in the binder ingredient). Among other things, this facilitates the shaping procedure performed subsequently on the premix because significant water liquid or vapor amounts do not have to be eliminated in order to achieve an acceptable water activity in the simulated nut product. As generally known, the presence of water moisture in the product increases the spoilage risk and reduces shelf life.

The premix generally will comprise a combination of soy nut particles, nut flavoring, and binder in respective amounts effective to provide a premix composition. Preferably, this premix composition consists essentially of about 40 to about 80 percent soy nut particles, about 2.5 to about 25 percent nut flavoring, and about 10 to about 50 percent binder. More preferably, the premix generally will comprise a combination of soy nut particles, nut flavoring and binder in respective amounts effective to provide a premix composition consisting essentially of about 50 to about 70 percent soy nut particles, about 5 to about 15 percent nut flavoring, and about 20 to about 40 percent binder.

The premix may also have introduced optional ingredients or components such as, for example, salt, spices, flavorants, nutrients, vitamins, colorants, nutraceutical additives, antioxidants, probiotics, and the like, so long as they do not adversely effect the organoleptic, processing, or stability properties in a significant manner. In particular, the presence and amount of such optional ingredients can, of course, vary considerably depending on the specific nutrient and the targeted consumer, and to the extent it does not introduce an off flavor.

The premix ingredients can be added in any convenient order. The solid dry soy particles and solid dry nut flavoring particles can be preblended or added individually to the binder in preparing the premix. Preferably, in the case the binder is a solid particulate at processing temperatures, such as room temperature, the binder is gently heated to form a molten and flowable material, but not scorched or burned, before adding the soy and flavoring agent particles. Once the soy particles and nut flavoring particles are added to the binder, the resulting premix is stirred, mixed, or agitated by any convenient means generally used for that function in the food processing field until the soy particles and nut flavoring are essentially fully-coated and/or are well-dispersed in the binder.

The shaping procedure performed on the premix can be done in any convenient molding system or comparable shaping means. For instance, a two-plate mold having opposing platens provided with opposing indentations in each platen face, such that when pressed together, the opposing and matching platen face indentations together define a cavity into which the coated particle premix can be introduced in flowable form by pouring, injecting, and so forth, through a narrow passageway(s), such as a sprue or runner that leads through a platen(s) to the cavity. The cavity is filled with the premix.

In one implementation, the simulated nut forming step comprises introducing the premix into a two-plate mold defining a cavity in the shape of a natural nut until filled, compacting the premix in the mold cavity into a molded shape, and cooling or permitting the molded shape to cool.

The nut shaping/forming process performed on the premix according to the present invention may be operated in batch, semi-continuous, or continuous mode as desired. In the instance of a platen press mold, the present process generally is carried out at pressures of about 500 to about 10,000 psi and preferably at about 500 to about 6,000 psi.

While this invention is exemplified by the production of simulated whole nuts (i.e., unshelled, skin-peeled whole nuts), it also can be used to form other nuts shapes such as sliced or chopped nuts or desirable non-nut shapes by appropriately varying the mold shapes.

The finished simulated nut also can be coated with a different flavored substance, such as chocolate, or it can be salted, spiced, or otherwise flavored by a desirable flavoring substance that can be coated or sprinkled onto the surfaces of the simulated nuts and be retained thereon.

Once cooled and hardened into a self-supporting structure, the simulated nuts can be packaged. Preferably, the packaging material is designed to prevent, or at least significantly reduce, quality degradation during storage. The simulated nuts can be sealed in oxygen impermeable packaging materials or containers such as, for example, plastic bags, cans, jars, and so forth, under substantially oxygen-free conditions. Such substantially oxygen-free conditions can be obtained, for example, by inert gas (e.g., $N_2$ or $CO_2$) flushing prior to sealing or using vacuum packing techniques. The resulting simulated nuts provide shelf stable, high quality artificial nuts having crunch, texture, and organoleptic properties similar to natural nuts.

The following examples are intended to illustrate the invention and not to limit it. Unless otherwise indicated, all percentages using in the present specification are by weight. All patents and other publications cited in the present specification are hereby incorporated by reference.

EXAMPLE 1

This example illustrates the preparation of simulated whole peanuts (i.e., whole nuts without shell) using the process of this invention. Soy beans were blanched in boiling water with 1 percent salt for 45 minutes until the texture is soft from a mouth feel standpoint. The blanched soy beans were rinsed extensively and then freeze-dried.

A simulated peanut preparation having the following formulation was prepared as described below.

TABLE 1

| Ingredient | Weight (g) | Percent |
| --- | --- | --- |
| Soy grits | 20.0 | 60.6 |
| Peanut flour | 1.0 | 3.0 |
| Defatted peanut flour | 2.0 | 6.1 |
| Sucrose | 10.0 | 30.3 |

Freeze-dried soy nuts (20.0 g) were dehulled, coarsely ground, and screened to grits size (about 1 mm). The soy nut grits were dry blended with 1.0 g (fatted) peanut flour and 2.0 g defatted peanut flour, providing a dry particulate blend.

A binder was prepared from sugar powder. In a small pot, the sugar (10.0 g) was added with two drops of water. With continuous stirring the sugar was melted at medium to a high heat. Once the sugar was completely melted, the dry particulate blend were blended into the sugar binder with vigorous mixing for a brief time sufficient to coat the dry soy grits and other dry blend particles. While the sugar coating was still in a molten state, the sugar-coated dry grits and particles were loaded into a two-plate compactor mold defining a cavity in the shape of a peanut (whole nut without shell). The cavity was filled by the premix of coated grits, and compacted at 500 psi for about 20 seconds. The nut product was allowed to cool at room temperature, providing a self-supporting body.

The simulated peanut manufactured in this manner was subjected to visual and sensory evaluations and was found to have an appearance, taste, and crunchy texture similar to a natural peanut.

EXAMPLE 2

The procedure of Example 1 was repeated except that the soy grits were ground to a smaller particle size (i.e., 0.5 mm or 500 micron). The peanut formed had a smoother and more uniform surface. The texture, although slightly less crunchy than the nut made according to Example 1, was satisfactorily crunchy.

EXAMPLE 3

A honey roasted peanut was prepared in which honey was used as the binder and flavoring. The formula and procedure was the same as in Example 1 except that the melted sugar was replaced with honey. After the peanut was formed, it was further dehydrated in a convection oven with hot air flow at 90° C. to reduce the moisture content introduced by the honey. The resulting simulated honey roasted peanut had a very pleasant honey taste and crunch similar to peanuts.

EXAMPLE 4

A salty type of peanut was formulated by replacing sugar with dextrose and using salt as flavoring. The salt ingredient was added to the melted dextrose along with the blend of soy bits (Sun Rich Fresh Co., Richmond, British Columbia) and peanut flours with vigorous mixing. Otherwise, the procedure used was the same as described in Example 1. The formula of the ingredients used in this regard was as follows.

TABLE 2

| Ingredient | Weight (g) | Percent |
| --- | --- | --- |
| Soy grits | 20.0 | 59.7 |
| Peanut flour | 1.0 | 3.0 |
| Defatted peanut flour | 2.0 | 6.0 |
| Dextrose | 10.0 | 29.8 |
| Salt | 0.5 | 1.5 |

The resulting simulated salt roasted peanut had an excellent texture and flavor resembling real salted peanuts.

EXAMPLE 5

A simulated cashew nut was prepared using a metal fabricated mold with two engraved matching halves defining a cavity corresponding to a natural shape of a typical cashew. The formula of the ingredients used in this procedure was as follows.

TABLE 3

| Ingredient | Weight (g) | Percent |
| --- | --- | --- |
| Roasted soy grits | 40.0 | 54.1 |
| Ground cashew | 10.0 | 13.5 |
| Low DE corn syrup | 24.0 | 32.4 |

The low DE corn syrup (24DE) was used as a binder in this procedure. The corn syrup (24.0 g) was heated in a saucepan under low heat, and water was evaporated with vigorous mixing to prevent burning. Once the syrup reached a sticky consistency, pre-blended ground cashew nuts powder (10.0 g) and roasted soy grits (40.0 g) were added and mixed vigorously to coat the particulate with the heated syrup. The pan was removed from the heating source. The sticky blend was then loaded into the forming mold, and compacted using a Carver press at 2000-5000 psi for 5-10 seconds. The pressure was then removed and the compacted nut was removed from the mold. The simulated cashew was further coated with different flavors and spices, including cashew flavor, salt, sugar, cinnamon, and cocoa powder. The resulting simulated cashew had a similar three-dimensional appearance as a natural cashew nut, and it had an excellent crunchy texture and flavor that was very close to a natural roasted cashew.

Additional simulated cashews were prepared having different flavors. Salty cashews were prepared according to the same procedure described above in this example except that 0.6 g salt also was added to the heated syrup in addition to the dry blend of cashew powder and soy bits. Honey roasted cashews were prepared according to the above procedure except that the corn syrup was replaced with an equivalent amount of honey, and after the cashew was formed, it was further dehydrated in a convection oven with hot air flow at 90° C. to reduce the moisture content introduced by the honey. Chocolate coated cashews were prepared by adding the step of coating the simulated cashews with melted chocolate. All of these simulated cashew products were crunchy and had a pleasant cashew flavor.

EXAMPLE 6

A reformed almond was produced in a similar manner as the procedure of Example 5 except that the ground cashew nut was replaced by an equivalent amount of ground almond nut. The resulting nut had an excellent appearance and a taste resembling real roasted almonds.

While the invention has been described in terms of preferred embodiments, those skilled in the art will recognize that the invention can be, practiced with modification within the spirit and scope of the appended claims.

We claim:

1. A process for producing simulated nuts, consisting essentially of (a) providing a premix by mixing about 50 to about 70 percent soy nut particles having a particle size between about 177 to about 2000 microns, about 5 to about 15 percent nut flavoring, and about 20 to about 40 percent binder comprising at least about 90 percent saccharide, wherein the binder is in a wet flowable form and includes less than about 1 percent water, wherein the nut flavoring comprises comminuted natural nut meat, and wherein the soy nut particles and nut flavoring are coated with the binder; (b) compacting the premix into discrete, simulated nut shapes; and (c) cooling the simulated nut shapes to be self-supporting and essentially free of air pockets.

2. The process as defined in claim 1, wherein the binder is selected from the group consisting of sucrose, dextrose, fructose, maltose, lactose, cellobiose, kojibiose, galactose, high fructose corn syrup, corn syrup, high maltose corn syrup, maltodextrin, starches, hydrocolloids, and mixtures thereof.

3. The process as defined in claim 1, wherein the binder is selected from the group consisting of honey, corn syrup, molasses, brown cane sugar, sugar beet sugar, maple syrup, and mixtures thereof.

4. The process as defined in claim 1, wherein the binder is melted sucrose.

5. The process as defined in claim 1, wherein the nut flavoring comprises solid particles of comminuted natural nut meat.

6. The process as defined in claim 1, wherein the nut flavoring comprises comminuted natural nut meat selected from the group consisting of grits of natural nuts, natural nut flour, and mixtures thereof.

7. The process as defined in claim 1, wherein the nut flavoring comprises comminuted natural nut meat selected from the group consisting of peanuts, almonds, walnuts, pistachios, pecans, hazelnuts, macadamia nuts, Brazil nuts, chestnuts, pine nuts, pignolia nuts, and mixtures thereof.

8. The process as defined in claim 1, wherein the discrete, self-supporting simulated nut shapes are formed by introducing the premix into a two-plate mold having a plurality of cavities of desired shapes, compacting the premix in the mold cavities to form the desired shapes, and cooling the molded shapes.

9. A process for producing simulated nuts, said process consisting essentially of (i) blending soy nut particles having a particle size of about 177 to about 2000 microns with a natural nut flour to provide a dry particulate blend; (ii) providing a binder comprising at least about 90 percent saccharide, wherein the binder is in a wet flowable form and includes less than about 1 percent water; (iii) forming a premix consisting essentially of about 50 to about 70 percent soy nut particles, about 5 to about 15 percent natural nut flour, and about 20 to about 40 percent binder by blending the dry particulate blend and the binder wherein the soy nut particles are coated with the binder; (iv) introducing the premix into a two-plate mold defining a plurality of cavities forming the shapes of natural nuts; (v) compacting the premix in the mold cavities into discrete molded shapes; and (vi) cooling the molded shapes to provide the simulated nuts.

10. The process as defined in claim 9, wherein the soy particles are selected from the group consisting of soy grit, soy flour, and mixtures thereof.

11. The process as defined in claim 9, wherein the binder is selected from the group consisting of sucrose, dextrose, fructose, maltose, lactose, cellobiose, kojibiose, galactose, high fructose corn syrup, corn syrup, high maltose corn syrup, maltodextrin, starches, hydrocolloids, and mixtures thereof.

12. The process as defined in claim 9, wherein the binder is selected from the group consisting of honey, corn syrup, molasses, brown can sugar, sugar beet sugar, maple syrup, and mixtures thereof.

13. The process as defined in claim 9, wherein natural nut flour is selected from the group consisting of flours from peanuts, almonds, walnuts, pistachios, pecans, hazelnuts, macadamia nuts, Brazil nuts, chestnuts, pine nuts, pignolia nuts, and mixtures thereof.

14. The process as defined in claim 9, wherein the premix in the cavities is compacted at a pressure of about 500 to about 10,000 psi for about 1 to about 90 seconds.

* * * * *

UNITED STATES PATENT AND TRADEMARK OFFICE
CERTIFICATE OF CORRECTION

PATENT NO. : 7,572,476 B2
APPLICATION NO. : 10/322940
DATED : August 11, 2009
INVENTOR(S) : Akashe et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 964 days.

Signed and Sealed this

Seventh Day of September, 2010

David J. Kappos
*Director of the United States Patent and Trademark Office*